(12) United States Patent
Hilpert, Jr. et al.

(10) Patent No.: US 6,469,712 B1
(45) Date of Patent: Oct. 22, 2002

(54) PROJECTED AUDIO FOR COMPUTER DISPLAYS

(75) Inventors: Edwin James Hilpert, Jr.; Michael A. Paolini, both of Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,387

(22) Filed: Mar. 25, 1999

(51) Int. Cl.[7] .................................................. G06F 3/00
(52) U.S. Cl. ................... 345/727; 345/757; 345/835; 345/856; 345/862; 345/764; 340/384.1
(58) Field of Search ................................. 345/764, 700, 345/727, 729, 862, 859, 856, 978, 757, 848, 835; 340/384.5, 384.1, 384.3

(56) References Cited

U.S. PATENT DOCUMENTS

| | | | | |
|---|---|---|---|---|
| 4,817,149 A | | 3/1989 | Myers | 381/1 |
| 5,337,363 A | * | 8/1994 | Platt | 381/17 |
| 5,461,399 A | * | 10/1995 | Cragun | 345/145 |
| 5,533,182 A | * | 7/1996 | Bates et al. | 395/155 |
| 5,666,555 A | * | 9/1997 | Okazaki et al. | 395/807 |
| 5,771,041 A | * | 6/1998 | Small | 345/700 |
| 5,801,692 A | * | 9/1998 | Muzio et al. | 345/764 |
| 5,982,352 A | * | 11/1999 | Pryor | 345/156 |

* cited by examiner

Primary Examiner—Raymond J. Bayerl
Assistant Examiner—Cuong T. Thai
(74) Attorney, Agent, or Firm—David A. Mims, Jr.; Robert V. Wilder

(57) ABSTRACT

A method and implementing computer system is provided in which sounds are projected or rendered in space surrounding a computer system to provide information concerning various aspects of information displayed on the computer system display screen. Computer system users are able to ascertain predetermined information relative to the displayed information, such as a relative scroll point in a lengthy context, by perceiving certain characteristics of the projected sounds, including the perceived location of the source of the projected sounds relative to a designated point of origin, such a user's head or the computer display screen.

22 Claims, 7 Drawing Sheets

PROJECTED AUDIO FOR COMPUTER DISPLAYS

RELATED APPLICATIONS

The present application is related to a co-pending application entitled "IMAGE FINDING ENABLEMENT WITH PROJECTED AUDIO", application Ser. No. 09/276,386, filed on even date herewith and assigned to the assignee of the present application.

FIELD OF THE INVENTION

The present invention relates generally to information processing systems and more particularly to a methodology and implementation for relating projected sound effects to computer display characteristics.

BACKGROUND OF THE INVENTION

As computer systems and applications continue to expand, new functions and capabilities are created and various devices and tools need to be developed to visibly present an interface for such capabilities to system users. The main computer system interface for user-driven computer systems and applications has been the display device along with a user input means such as a keyboard or mouse or trackball device. Other wireless input devices are also available.

Almost all computer system user input devices rely on visual indicia represented on a display screen to enable user input by means of a keyboard, or pointing device such as a mouse trackball or joystick, etc., for example. When a computer system is running a large number of applications, the various applications typically are represented by corresponding icons on the display, or within rectangular frames or windows from which a user can identify the particular program being represented. Further, all of the selectable functional features of any particular program are also represented by a visual indication on the display screen which can be activated by a user to invoke the selected function.

When a user wishes to switch from a current program to another program, the user "points to" the icon or window of the program on the display screen using the mouse or other pointing device and "clicks on" one of the buttons on the pointing device. Thereafter, when the user wishes to invoke a particular function of the application being worked, the user will point to and click on a corresponding visible screen area. With all of the various selectable visual indicia and icons represented on display screens, computer screen can become quite crowded and often it is difficult to determine whether a mouse-controlled pointer is pointing to one selectable area on the screen or another. This is an even greater problem with respect to visually impaired users. When a user points to one selection area and clicks on a mouse to activate a selected function, if the pointer was actually pointing to an unintended neighboring or adjacent screen area when the mouse was clicked, the wrong function will be performed, often with disastrous results. Even in the best case, the user will have to wait for the unintended function to complete before canceling the unintended results and re-activating the intended function. Recently, this problem has been recognized and addressed in U.S. Pat. No. 5,533,182, which is assigned to the assignee of the present application and included herein by reference. In that patent, an aural signal is provided to indicate a screen distance between a screen position identifier and a location of interest on the display screen. While this represents a major accomplishment in providing aural assistance in screen navigation, even further efforts are needed in this field to provide greater ease and facility in operating display screen-driven programs, including Internet applications, especially for visually impaired computer users.

SUMMARY OF THE INVENTION

A method and implementing computer system is provided in which sounds are projected in space surrounding a computer system to provide information concerning various aspects of information displayed on the computer system display screen. Predetermined information relative to the displayed information is rendered in projected sound and is perceived to emanate from points away from the computer system. By perceiving certain characteristics of the projected sounds including the perceived location of the apparent source of the projected sounds relative to a designated point of origin such a user's head or the computer display screen, certain characteristics of the images displayed on the display screen can be ascertained.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
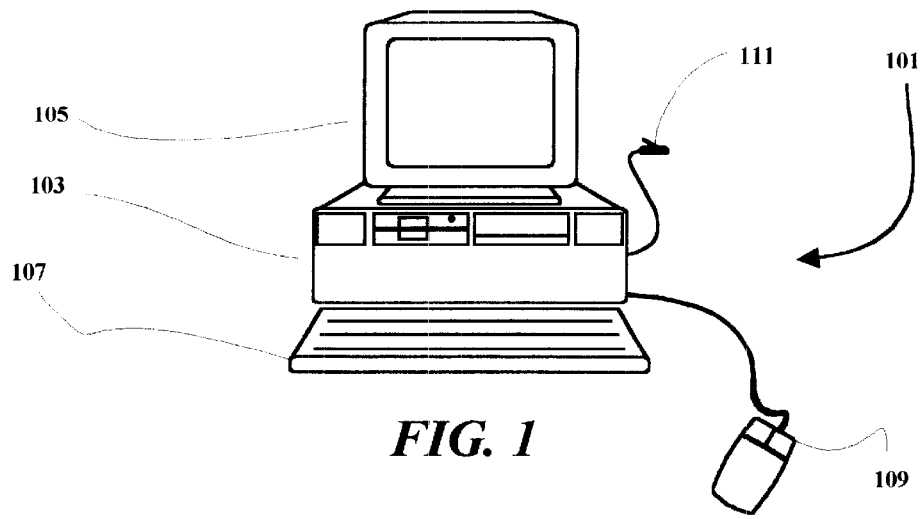
FIG. 1 is a diagram of a computer system in which the present invention may be implemented.

The various methods discussed herein may be implemented within a typical computer system which may include a workstation or personal computer. In general, an implementing computer system may include a plurality of processors in a multi-bus system in a network of similar systems. However, since the workstation or computer system implementing the present invention in an exemplary embodiment, is generally known in the art and composed of electronic components and circuits which are also generally known to those skilled in the art, circuit details beyond those shown in the drawings are not specified to any greater extent than that considered necessary as illustrated, for the understanding and appreciation of the underlying concepts of the present invention and in order not to obfuscate or distract from the teachings of the present invention.

In FIG. 1, a computer system 101 includes an electronics enclosure 103 which is typically arranged for housing one or more CPUs (central processing units) along with other component devices and subsystems of the computer system 101. The computer system 101 also includes a monitor or display unit 105, a keyboard 107 and a mouse or pointing device 109, which are all interconnected within the illustrated computer system. Also shown is a connector 111 which is arranged for connecting a modem or other network connection within the computer system to a communication line such as a telephone line in the present example. The present invention may also be implemented in a cellular system without the connector 111.

Figure 2:
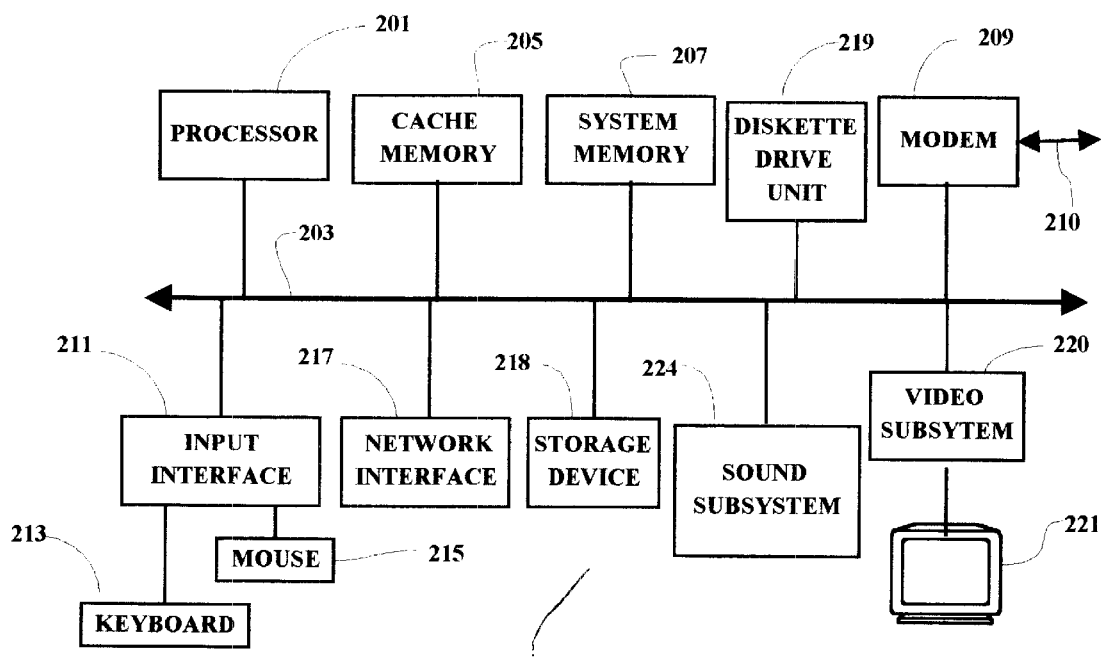
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a separate network subsystem interface 217 and a diskette drive unit 219. A sound producing subsystem 224 is connected to the system bus 203, and a video subsystem 220, which may include a graphics subsystem, is connected to a display device 221. A storage device 218, which may comprise a hard drive unit or CD ROM, is also coupled to the bus 203. The diskette drive unit 219 provides a means by which individual diskette programs may be loaded on to the hard drive, or accessed directly, for selective execution by the computer system 101. As is well known, program diskettes containing application programs represented by magnetic indicia on the diskette, or programs in system memory, or acquired through a local network or through the World Wide Web may be read to provide program signals. Such program signals are selectively effective to cause the computer system to present displays on the screen of a display device and respond to user inputs in accordance with the functional flow of the application program being executed.

In explaining an exemplary operation of the present invention, reference is made to a browser program running on a personal computer or "PC" although the principles involved are applicable to any computer program which may receive input from a screen display. In running an Internet access program or browser program on the computer system 101, the access or browser program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. As a program is running, either a portion of the program or the entire program may be loaded into the system memory 207 and/or the system cache memory 205. Depending on specific program design, the system may store any information accessed from a database in the storage unit 218, the cache memory 205, the system memory 207 or directly from a diskette loaded into the diskette drive 219. Assuming a user has started-up the system, and is actively running a browser program for example, from memory, a series of screens will be displayed to the user on the display device 221. Each screen typically has one or more selections for the user to make in navigating through the program. In general, a user will make selections from a display screen using the keyboard 213 or the mouse or pointer device 215. In an Internet operating program, the selections made by the user will determine "where" the user "goes", i.e. to what "site" or "webpage", and also, in some cases, the communications link or the path taken to get to the site selected. Further, programs may be downloaded and run within the browser program by means of additional selections made by a user through a mouse/pointer device.

Figure 3:
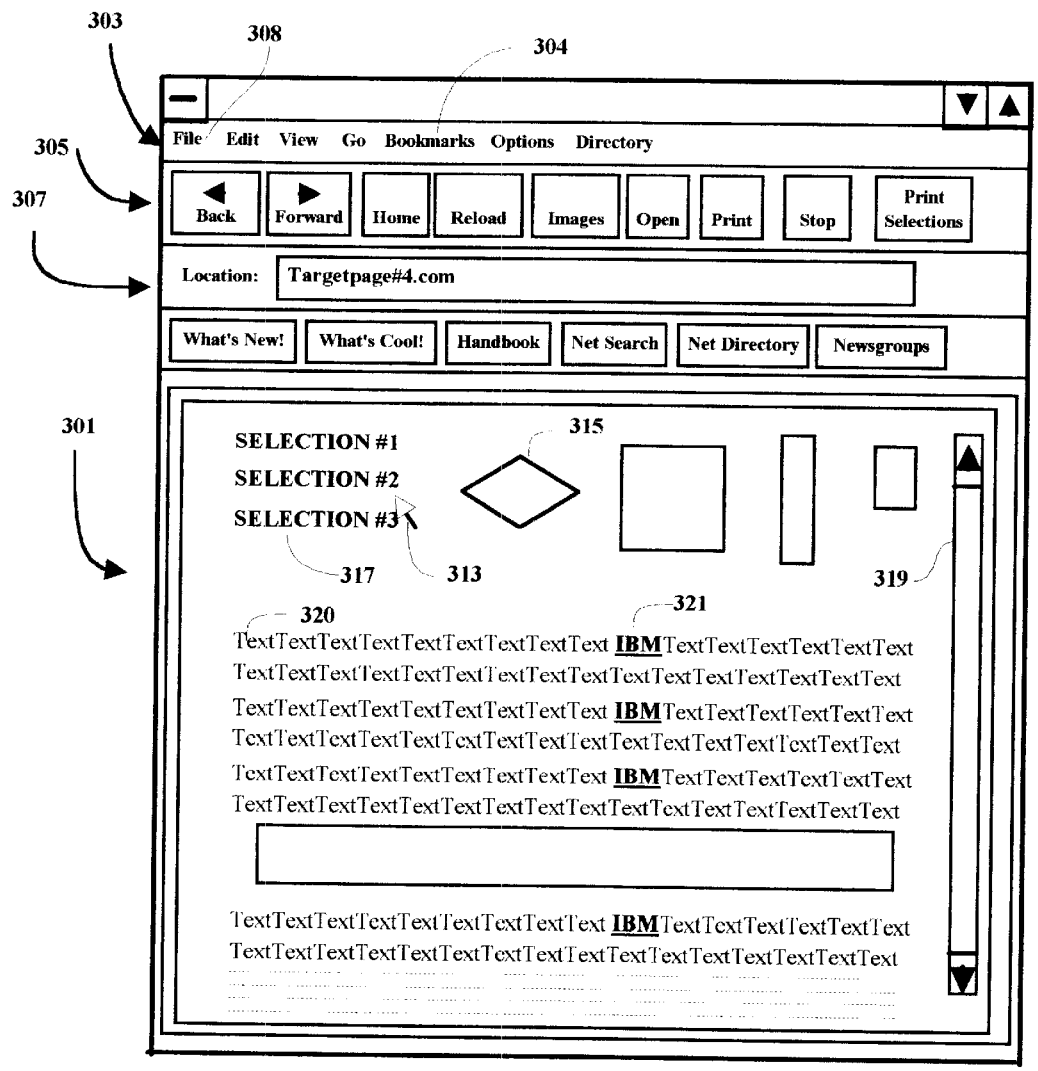
FIG. 3 is an illustration of a computer system display screen running a browser and other computer programs useful in explaining an exemplary operation of the present invention.

FIG. 3 illustrates a typical browser program screen display 301 in an Internet operating session. The browser screen generally includes a first row 303 which displays several different modes or functions which the user may select such as the "File" selection 308 and the "Bookmarks" selection 304. Another row 305 may be displayed to provide various operations which a user may select to help a user quickly move through documents, sites, or pages in a network session. A URL (Uniform Resource Locator) address or "location" section 307 on the screen enables a user to key-in, and also displays the name of, an internet address of a site to be, or being, visited. Other quick access buttons may be implemented on the screen for quick access to other selected network services and/or network functions such as "What's New" or "Net Search". In general, any of the illustrated items may be selected through a "point and click" methodology associated with the mouse device 215, and a cursor or pointer indicium 313 visible on the display screen. For example, a download of data from a remote site may be immediately terminated during the transmission by pointing to the "Stop" button and clicking on a designated mouse button. Similarly, the "Back" and "Forward" buttons may be used to return to the last screen display or web site, or go forward to the next screen display or web site, respectively. Typically all of the selectable functions take some time to be invoked and carried to completion. Thus, if a wrong block is selected by accident, because of the inability to precisely see and place a cursor within a desired selectable screen area, the user may be sent to another web site and much time will be lost in returning to the desired site from which a desired function may be selected.

In FIG. 3 there is also shown a partial text section 320, for example, which may include "Hyperlinks", such as the highlighted "IBM" text 321 as illustrated. Hyperlinks are typically set out in bold type and underscored, and often displayed in a contrasting color for easy recognition. Hyperlinks typically comprise a grouping of descriptive words which if selected by a user through the positioning and clicking of a pointer will access the page or site which is designated by the link. The hyperlinks activate an access program to the selected site, unlike plain text on the page which merely represents text only without any functional aspect. Through the use of hyperlinks, a user may relatively quickly identify a possible site of interest and click on the hyperlink to immediately access that site from the current page. However, hyperlinks and other possible screen selections may not be so easily marked and identified. For example, in the display screen 301, three possible "active text" selections are shown 317 which are not visually clearly distinct from each other. Thus, it is possible to point in an area between two of the selections (as shown by pointer 313) and invoke the undesired selection. Hence, an audible indicium would be helpful in avoiding that potential problem by generating different sounds when the pointer is pointing to corresponding different screen areas.

The exemplary page illustrated in FIG. 3 may be a web site page which includes other visually discernable active indicia or displayed images or icons which may be activated by pointing and clicking with the mouse and pointer 313. FIG. 3 includes several graphic areas such as area 315, which may include text or an identification of a related page which may be pointed to and selected. A scroll bar 319 is also illustrated to enable a user to point to an "up arrow" or a "down arrow" within the scroll bar, to navigate through a document that is longer than the displayed text.

In one embodiment, the present invention is implemented in connection with the scroll bar to provide an audible indication of where the displayed section of the document is relative to the entire document. This is accomplished through the selection (FIG. 8) and use of a "mark origin" function. As a user is reading through a document for example, and wishes to move to another location in the document, the user may mark the current place in the text document, and move to other locations in the document. If the user selects the 3D enhanced audio effect along with a mark origin function, the enhanced audio function will generate a sound (as selected) at a distance away from the computer screen. As the user scrolls farther away from the previous marked point, the selected sound will appear to be moving away from the computer display (as an arbitrary point of reference). This function will provide an audible indication to the user, in addition to the visual slide bar, of how far away from the marked origin in the document that the user is at any given time. When the document is very long and the user is many pages away from the starting point, the selected sound will sound far off in the distance.

The use of perceivable "depth" or "distance" of a generated sound from a computer display screen has many beneficial applications. The present invention as herein disclosed teaches the use of projected sounds, in two or three dimensions, as they may be related to various computer screen functions and cursor positions in general. In the present disclosure, the term "projected" is used to designate that the sounds are projected away from the computer unit and are perceived by a user to be emanating from points remote from the computer unit. The perceived points of emanation are programmed to provide information to a computer user concerning the status or condition of a program that is running on the computer station. Several examples are discussed but the illustrated examples are not to be taken as limiting the invention in any way but rather as examples to illustrate several typical operations.

As is apparent, a typical computer program contains many different windows and functions and operations from which a user may choose to invoke whatever function is desired by the user. However, since all of the various functions and operations are accessed or selected through visual identification techniques such as a "point and click" methodology, these rich computer resources are not readily accessible by visually impaired users. Moreover, with greater numbers of interface indicia presented on computer display screens, it is more difficult to determine when a pointer device is pointing to a screen area desired by the user or to an undesired area adjacent thereto. When an incorrect screen area is pointed to in a point-and-click activation, an incorrect program is inadvertently activated and this will result in unnecessary processing time in returning to the launch point to launch the correct icon.

As hereinbefore discussed, visually impaired individuals also often have difficulty navigating through an expansive screen presentation or lengthy document when only a portion of the file or document is presented on the display screen. Aural enhancement as herein disclosed, not only helps the user find small activation screen areas or hyperlinks in a large context by means of a "Find" command, but also can provide a sense of where the cursor is in a lengthy document file. That situation typically requires the use of a "scroll bar" in two or more directions. Such scroll bars are typically designed not to take up much space on a working screen and are therefore difficult to point to and manipulate through a related file or document. In accordance with the present invention, a computer user aural environment is selectively created which is used in distinguishing and ascertaining various characteristics associated with a computer program display. Such characteristics may include, for example, "layers" of windows and icons presented on a display screen as well as "depth" of file or document which may be only partially displayed on a user screen. Projected sound may also be implemented in connection with many other functions as well as the types of display activation and functional areas represented on a computer screen display.

The concepts of stereo sound and three-dimensional or "surround sound" are well known and have been implemented in entertainment and other systems which are available to the public. The details of implementing three-dimensional sound are disclosed, for example, in U.S. Pat. Nos. 4,817,149 and 5,337,363, which are included herein by reference.

Figure 6:
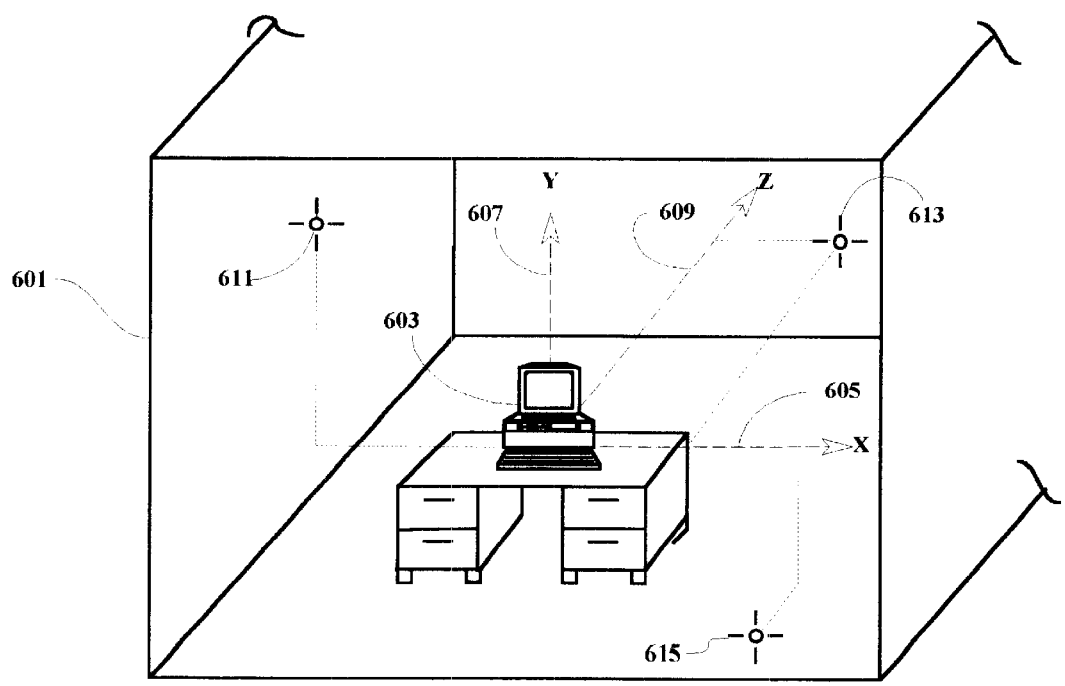
FIG. 6 is an illustration useful in explaining computer generated projected sounds in a computer environment.

Referring to FIG. 6, an exemplary computer environment is illustrated in which a PC 603 is positioned on a desk within a room 601. An "X" or horizontal axis 605, a "Y" or vertical axis 607 and a "Z" or depth axis 609 are illustrated relative to a predetermined origin. In the example, the origin is determined to be at the center of the PC 603 but can be defined to be at any location including the head of a user who may be sitting at the desk 603.

In accordance with the present disclosure, sounds are related to computer display characteristics and are "projected" from a computer station 603 to be perceived by a user to aid in ascertaining the content of the display screen. The projected sounds may be in a single plane, i.e. in two dimensions around a computer station, or in three-dimensional space surrounding the computer station. As illustrated, sounds may be "projected" from the computer 603 and be perceived as emanating from various other points in the room 601. For example, sounds may be generated to be perceived by a user as "coming from" point 611, which is above and to the left of the user, or from point 615 which is below, to the right and to the rear of the user, or from point 613 which is at the same level as the user but displaced along the "Z" axis in front and to the right of the user. The present invention, by providing multi-dimensional aural position feedback, in the form of audio effects and/or audio tones, permits a user to be able to determine both the size and content of a context and the relative position of screen activation areas such as controls and links within that context. Projected audio feedback is provided based on the current size and position of the content area being displayed. The audio feedback makes use of headphones or a plurality of speakers and small time delays for sounds reaching each speaker, and hence each ear of the user. This creates a sound that is interpreted by the user as being located in different places in space around the user.

Thus, for example, with 3-D audio feedback, the perceived "location" of the voice in a screen reader, while remaining completely intelligible, can move around in 3-D space to indicate the relative position of an "object" in relation to a designated "origin", which would normally be the user's head or the display screen. Position is defined in terms of any coordinate or vector system, and with an added parameter or dimension for "depth". Relative "position" is rendered for movements up and down, left and right and forward and backward with the same mechanism (e.g. cursor movement and operational code) thereby providing the user with an excellent "feel" of where an object (a desired screen area or icon for example) is within a context.

Feedback methods include persistent mapping of controls and links. Screen "buttons" and "controls" can be identified and located by projected sound in 3D space by means of an "audio glow" effect. One such implementation of the audio glow would be a single tone of configurable duration wherein the tone or frequency would be related to the type of control. For example, in such an implementation, a duration of "−1" would represent a continuous and a duration of "0" as "hidden". In other words, different types of controls (e.g. buttons, scrollbar, pop-up menu items, hypertext link, "back", "forward", input line, "end session" command, "stop", "search", etc.) have different base sounds associated with the particular type. The tone is located in position relative to origin. "Origin" is configurable and may be configured to be the center of the context for converting the visual information to audio. As a user scrolls "up" from the center of a context, a related projected sound is generated which "appears" to move progressively forward and away from the "origin", i.e. the computer station or the user's head. When scrolling downwardly, the projected sound appears to move progressively backward and away from the designated origin.

For "rendering" the audio information, origin would again be used and configured to be the location of the computer workstation or the user's head, for example, such that a control on the upper left of a window is rendered in 3D audio to have the sound appear to be emitted from a place in space above and to the left of the workstation or user. In another example, if a desired window is "under" the top layer of windows on a display screen, the sound is rendered in 3D audio to have the sound appear to be emitted from a place above and to the left of the user and also an incremental distance in front of, or forward of, the workstation or user to represent a window layer depth on a screen display having several layers of windows.

Because multiple tones may be difficult for some users to positionally discern when played simultaneously, the "control" and "link" positions are cycled through one or more at a time at the user's option. Contact by a virtual cursor or pointer with a virtual object in 3D space will give audio feedback. Such feedback is different or in addition to the feedback provided for an object which has the input focus (which may, for example, be the output of a screen reader function "reading" the label of a button).

In another implementation of 3D audio system output, the pointer is mapped via positional sound. Thus, the "mosquito mouse" is the third aural equivalent of the "comet cursor" (i.e. tracking mouse pointer movement with a decreasing size and intensity, across a screen, making it easier to follow and locate). This can be achieved by positional variance of sound and volume. Again mouse-over events (i.e. the mouse controlled pointer moves across a particular screen area or object on the display screen) can trigger audio feedback for contacting a selectable element or an element in the requested subset, such as the "IDENTIFY" or "FIND" functions explained below.

In another exemplary embodiment implementing the 3D audio display screen, a set of "Identify" commands is made available to a user. Upon executing a predetermined keyboard input such as "Cntrl-n", where "n" is a series of different keystrokes corresponding to a series of specific types of controls, or upon an execution by a user of a predetermined mouse and mouse button manipulation, a 3D audio program "scans" a display screen and causes various sounds to be emitted. Such sounds are 3D sounds which are perceived to be emitted from various points in space relative to a user's head for example. The audibly perceived location in 3D space of the generated 3D sound tells the user, in terms of both coordinates and screen depth, exactly where a selected type of control is located on a display screen; and the kind of sound (such as a "buzz" or bell or whistle, or tone, etc.) that is generated tells the user what specific kind of control (such as a link, a control for the cursor movement, a scroll command, etc.) is being located.

In one example, a user may initiate an "Identify Links" command, where the links represent selectable items within the context of the object that has the focus. For example, in the context of a browser, the "links" would be "hyperlinks" and in the context of the desktop the "links" would be icons. Optionally, this function can be combined with the "audio glow".

In another implementation, an "Identify Controls" command would generate 3D sounds to indicate locations on the display screen of various "controls". The sounds are generated in sequence in some predetermined order to give the user a sense of relative position with respect to each control for which a sound is generated. A "control" is an object or widget (e.g. buttons, sliders, menu bars, menus, pop-up menus, etc.) that has an effect on another object or set of objects or widgets. Optionally, this can also be combined with the audio glow implementation. Further, controls at different levels or depths relative to the screen surface, can be distinguished using different octaves.

In another example, a user may initiate an "Identify Containers" command where a container is an object that will accept other objects within a context. "Containers", such as windows, refer to a means of containing or delimiting a graphics, or text or other presentation or displayed image which may or may not be activated with a mouse "click". An "Identify Context" or "Find" command will generate sounds to identify a self-contained 2D screen area defined by the user. This command would be especially useful in the case of a "zoomed" resolution, i.e. where the entire screen was not being audibly rendered but only a section of the screen.

"Resolution" of the audible representation of the screen is controlled by and relative to the size of the virtual sound space. Thus, aural space corresponding to a display screen can be virtually unlimited which allows for greater accuracy in identifying screen locations in terms of 3D space around a user.

Figure 7:
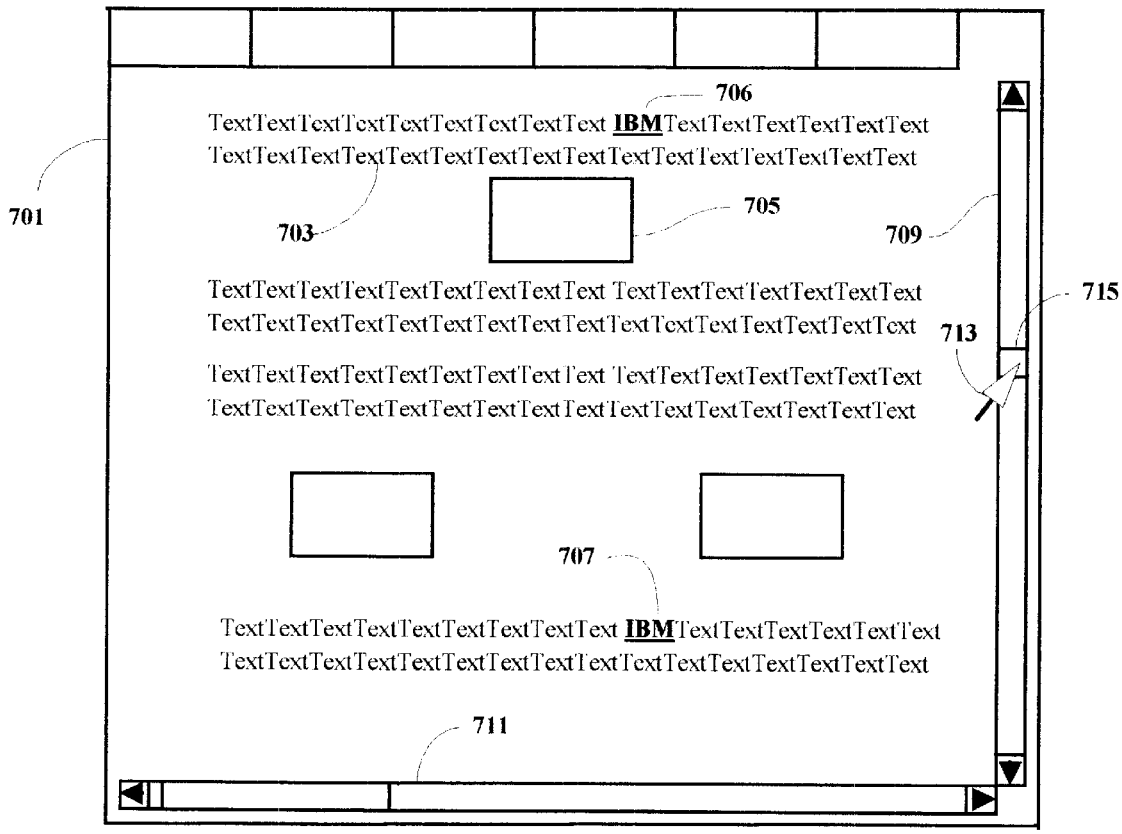
FIG. 7 is an illustration of a typical screen display including scroll function bars which are related to projected sound in one exemplary implementation of the present invention.
Figure 8:
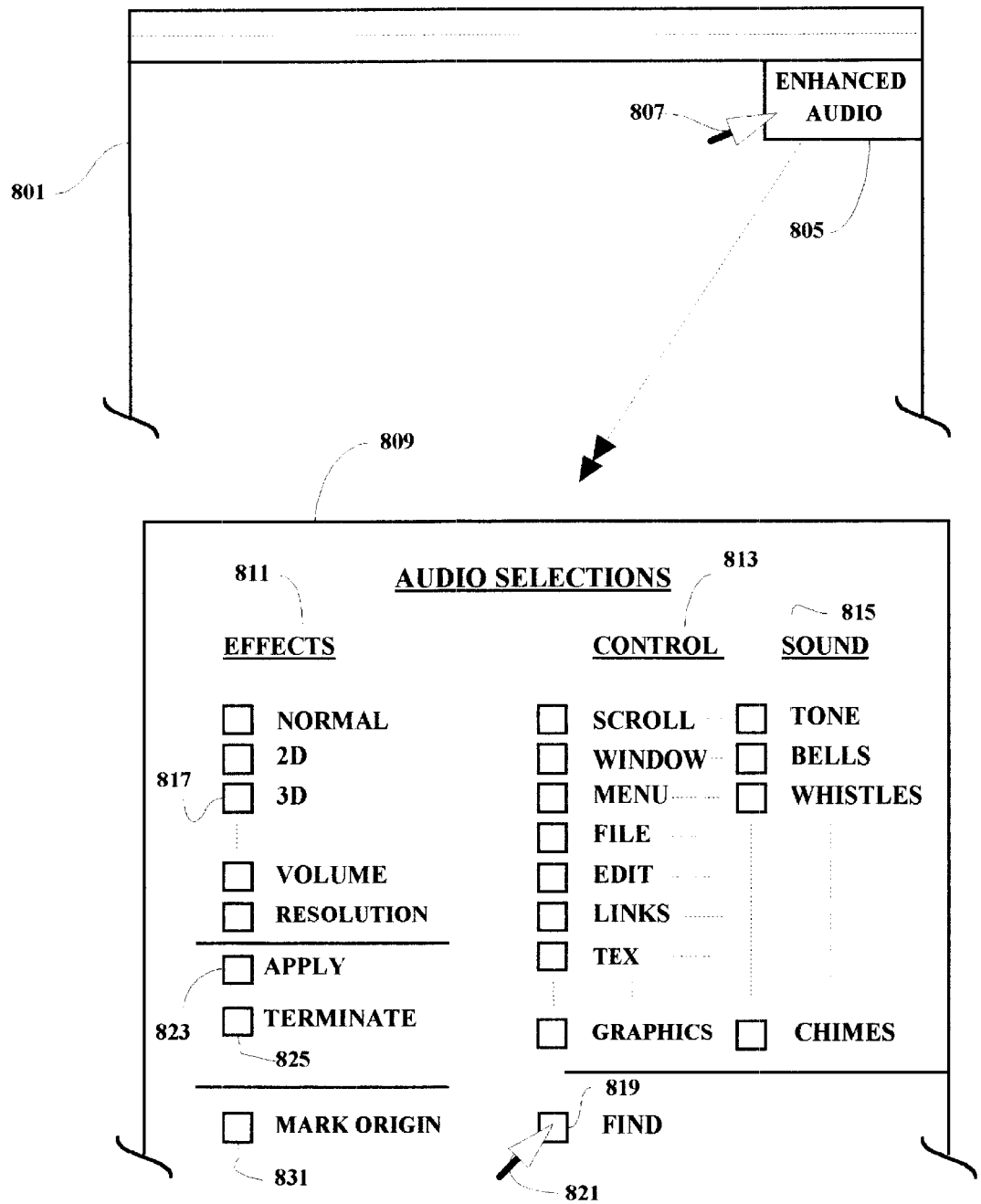
FIG. 8 is an illustration of an exemplary operation of a selection screen function which may be implemented in connection with the present invention.

The projected sound teachings of the present invention are applicable to any computer application which includes a display interface. The present invention may be implemented in connection with a browser program in working Internet sessions and may also be used in basic stand-alone applications such as word processor, worksheet and database applications. Further, computer display sound depth projection as herein disclosed may be implemented to great advantage in connection with 3D related applications such as construction applications where three dimensional illustrations of buildings and structures are illustrated and manipulated. Great advantage is also available to 3D worksheets having variables in three dimensions. FIG. 7 and FIG. 8 illustrate an example of how the present invention may be implemented in a text document displayed on a website page.

As shown in FIG. 7, a portion of a document file is displayed on a display screen 701. The document includes text areas 703 as well as graphics areas such as area 705, and hypertext areas such as 706 and 707. The graphics areas 705 and hypertext areas 706 and 707 are sensitive screen areas which are effective to go to different sites when pointed to by a mouse device pointer 713 and clicked by a user. The displayed portion represents only a portion of a larger document and a vertical scroll bar 709 as well as a horizontal scroll bar 711 may be used in connection with a pointer device to navigate to other areas of the document.

The audio enhancement methodology may be implemented in the FIG. 7 application as illustrated in the FIG. 8 example. In FIG. 8, an "Enhanced Audio" selection block 805 is made available on the display screen 801 along with the other selectable functions of the program (not shown). When selected by a user by pointing arrow 807 to and clicking a mouse button on the "Enhanced Audio" area 805, a pop-up "Audio Selections" window 809 appears on the display 801. The selection window includes an "Effects" section 811 where a user can select the type of audio enhancement desired. The types in the example include normal non-projected sound, and 2D projected sound i.e. sound projected in one plane but beyond the computer station. The selections also include "3D" sound 817 which is effective to project sound in all three axes shown in FIG. 6. The user may also selectively adjust the volume of the projected sounds as well as the "Resolution" of the space around a computer system in which the audio projections of computer screen displayed images are rendered. In another selection area, the controls 813 to which the sounds will be applied, as well as the particular sound 815 per control may be chosen by the user. For example, The user may select any of several functions to be enhanced with audio. Such functions include the scroll function, which will generate a sound related to the relative position of a slider 715 in a scroll bar 709 for example. That projected sound could be a normal "within display" sound, or a 2D projected or 3D "depth" projected sound as may be selected by the user.

With other selections, the user may have a sound generated each time a new window is entered by the cursor or mouse arrow. The "Menu" selection would have another selectable sound generated whenever the arrow is over a menu item, meaning that a click at that time would open an on screen menu. The user may also select the "Links" selection which would cause the program to generate a sound whenever the cursor or arrow is over a "link" such as an active graphics screen area or hypertext area, meaning that if a user were to click on the mouse button when the selected "links" sound is heard, the computer would be linked to another web site. For each function selected, the user is able to select a desired sound 815 such as a tone or bell sound to be associated with the chosen function.

When a user has completed the selection process, the user can apply his selections to the program being worked by clicking on the "Apply" button 823. If a user wishes to end the enhanced audio effects, the user may pop-up the audio screen 809 and select the "Terminate" button 825. In another function, a user may select particular controls or types of displayed information such as may be listed in the controls section 813 and then point to 821 and click on the "Find" button 819. At that time, the program will scan the displayed screen for the selected controls and cause a related sound to be generated whenever one of the selected controls is located. This feature is especially helpful in finding controls or hypertext which are embedded in "busy" contexts or documents. The projected sounds would aurally indicate to the user where the selected controls are on the screen. For example, a control at the top of a document when the user is at the end of the document would be identified or "found" and a related sound would be projected to appear to come from a point above and forward of the user or the display screen origin. The user would then know where the particular function button is located in the document, and that the user would need to scroll up in the middle of the screen to have the selected function button presented in the displayed screen area.

In another example, a "Mark origin" button 831 may be selected to mark a present position of a user as the user's origin in a lengthy document. Thereafter, the user may navigate through the document and an audio glow or buzz or other background sound is generated to keep the user aware of where the user is in the document relative to the marked origin of the user. With 3D enhancement, the "glow" would be sounded in terms of depth, i.e. along the "Z" axis, such that when the user is far from the marked origin, the glow position sound will sound far away and as the user scrolls toward the marked origin, the glow will sound as if it is coming closer to the display screen or the user's head, thus providing a 3D indication of a display screen characteristic. If the marked starting point in the document is only a couple of pages away, the selected sound will be projected by the computer to sound like it is close by the computer station. The "mark origin" function may be implemented as a toggle switch such that, after using the function, the user may return to the selection menu and toggle the "mark origin" function to an "off" state. Thereafter, the user may move to a new position an mark a new origin if desired. In another exemplary implementation, the sound of a hypertext screen area, with 3D projection, would make hypertext sounds, i.e. those sounds generated when a cursor goes over a hypertext screen area, to appear to be generated from a remote area thus indicating that the hypertext activation will take the user to a remote site or location.

Figure 4:
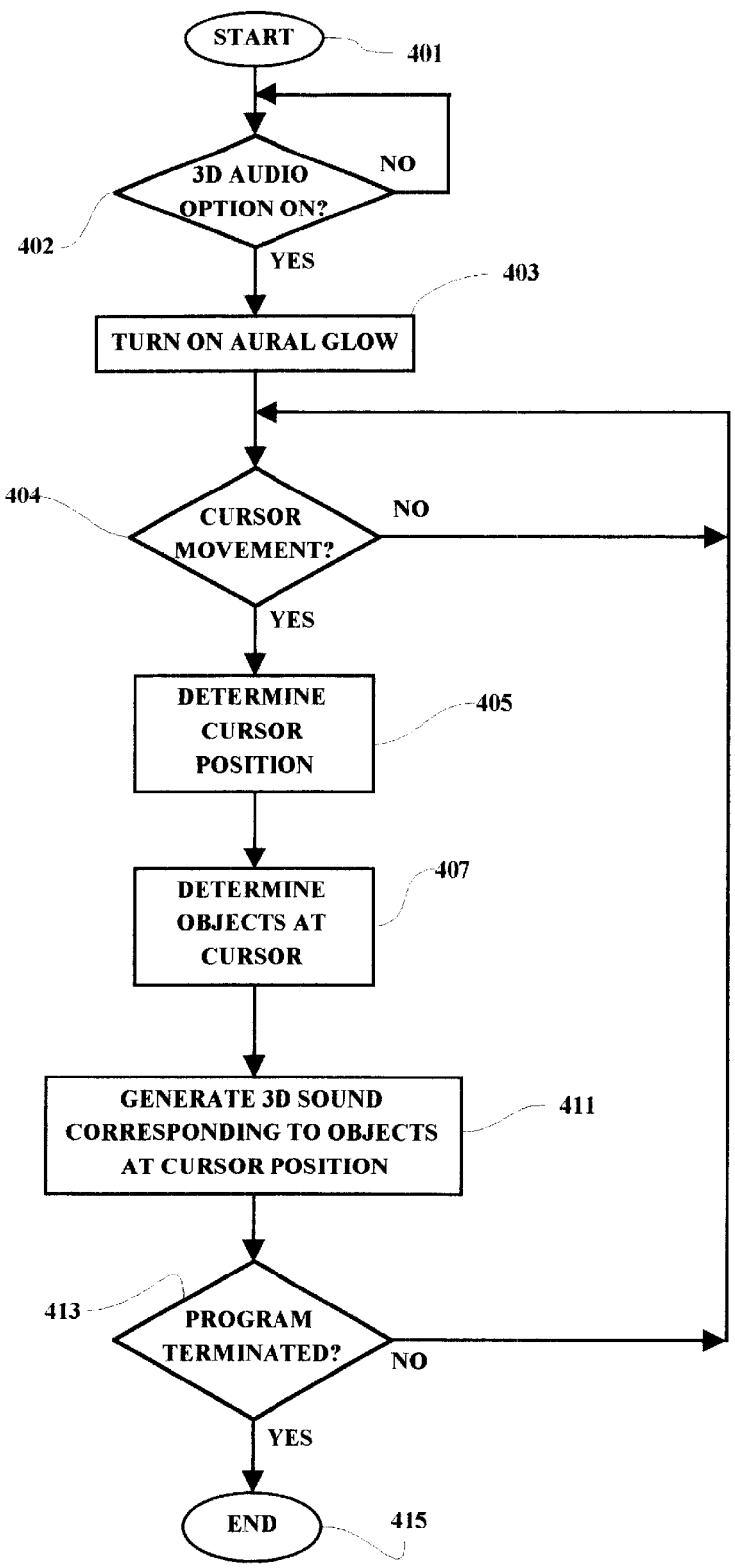
FIG. 4 is a flow chart illustrating one exemplary operational sequence in an exemplary implementation of the present invention.

An exemplary methodology implementing the sound projection or audio enhancements disclosed herein is illustrated in FIG. 4. As illustrated, when the process starts 401 a check is made to determine if the 3D audio option has been selected 402. When selected, a background aural glow is turned on 403. Whenever there is a cursor movement 404, the cursor position is determined 405 and it is determined what objects are located at the cursor position 407. Corresponding sounds are generated 411 as the cursor is moved on the display screen until the program is terminated 413 and the program ends 415.

Figure 5:
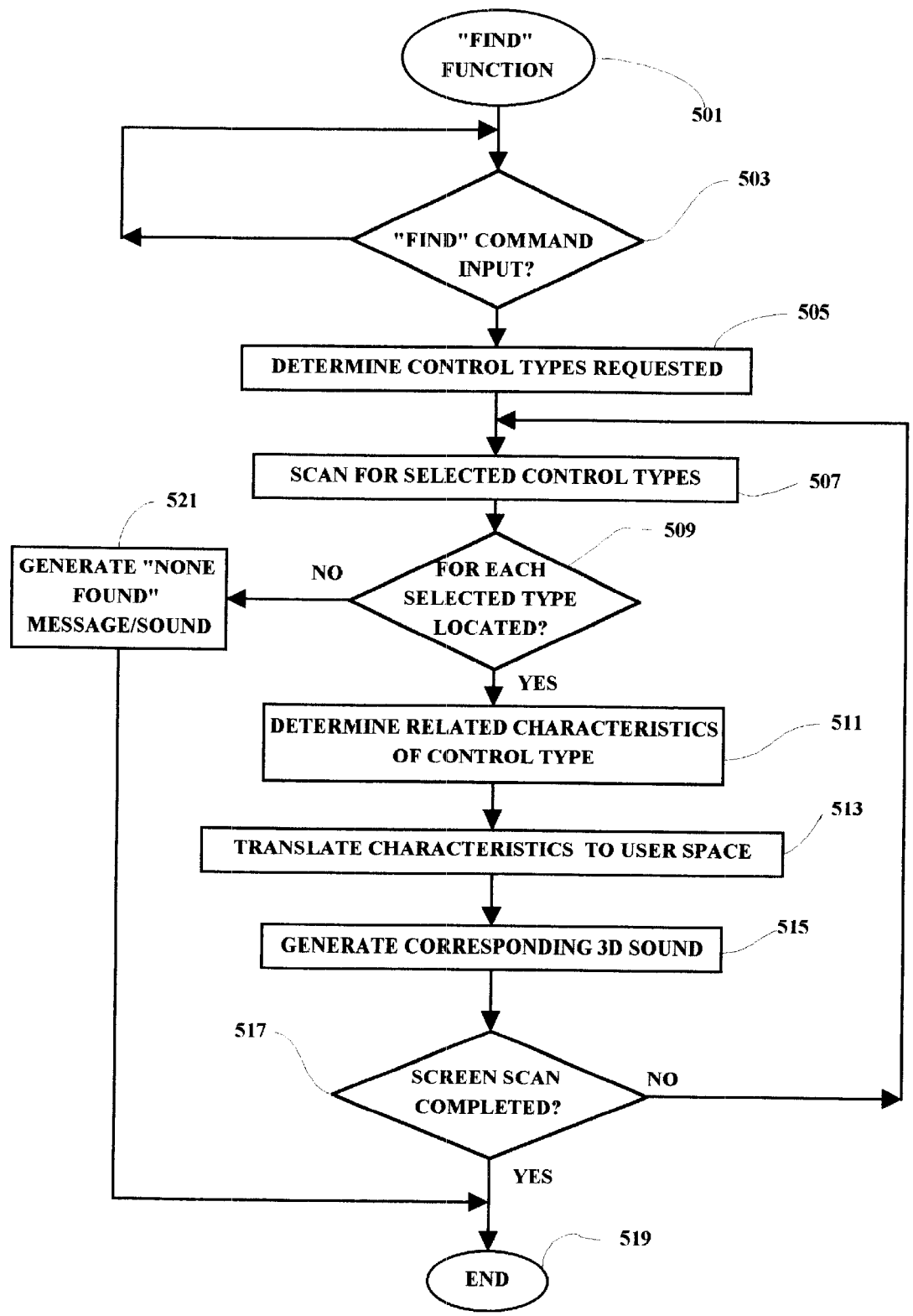
FIG. 5 is a flow chart illustrating another exemplary operational sequence in an exemplary implementation of the present invention.

Another exemplary "Find" or "Identify" operational sequence is illustrated in FIG. 5. As shown, when the process is initiated 501 and the "Find" command has been selected 503, the selected control type is determined 505 and the screen area is scanned for the particular control. For each control type found 509, the related characteristics of the control type are determined 511 (e.g. position of the control type in the context of the entire document) and translated to the user space 513, i.e. where in the 3D space surrounding the user is a point corresponding to the point in the document context of the "found" control. Next a sound is projected 515 from the computer which is perceived to be coming from the translated point in the user's space, i.e. the space surrounding the computer system. After the screen scan is completed 517 and all of the found images have been rendered in 3D space, the process is ended 519. A user may provide inputs to a selection screen submenu (not shown) to adjust the speed of the rendering of the sounds which correspond to the selected displayed image types. The user may also input other variables relative to the "Find" function. For example, a user may input a number of times to repeat the screen scan for selected screen image container types. All of the selections illustrated in FIG. 8 could also be used in the "find" function such that all image or container types could be searched for, with each having a different selected sound, or only one selected specific container or image type could be searched for with a corresponding associated sound being rendered.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for presenting audio effects in association with an image which may be displayed on a display screen of a computer system, said method comprising:

presenting a plurality of user selections on said display screen, said user selections being related to said image;

effecting a selection made by said user to associate a selected sound with a corresponding selected image;

determining an indicator location of a screen position indicator on said display screen;

detecting a presence of a displayed image at said indicator location; and projecting a sound from said computer system, said sound being related to said displayed image, said sound being projected to a point away from said computer system such that said sound is perceivable as emanating from an emanation point displaced in space from said computer system.

2. The method as set forth in claim 1 wherein position of said emanation point is related to a predetermined characteristic of said displayed image.

3. The method as set forth in claim 2 wherein said predetermined characteristic is a relative position of said displayed image on said display screen.

4. The method as set forth in claim 1 wherein said sound is projected to an emanation point displaced in three dimensions from said computer system.

5. The method as set forth in claim 1 wherein presence of a plurality of displayed images are detected.

6. The method as set forth in claim 5 wherein said plurality of displayed images are located at a plurality of locations on said display screen.

7. The method as set forth in claim 5 wherein said plurality of displayed images include at least two displayed images, said displayed images at least partially overlapping each other on said display screen.

8. The method as set forth in claim 1 wherein said user selections include a selection to effect said projecting of said sound.

9. The method as set forth in claim 1 wherein said user selections include a selection of a particular type of displayed image, said particular type being related to an associated selectable particular sound.

10. The method as set forth in claim 9 wherein said particular type of displayed image comprises a display of text.

11. The method as set forth in claim 9 wherein said particular type of displayed image comprises a display of hypertext links.

12. The method as set forth in claim 9 wherein said particular type of displayed image comprises a display of a scroll bar function indicium.

13. The method as set forth in claim 9 wherein said particular type of displayed image comprises a display container.

14. The method as set forth in claim 13 wherein said display container comprises a window presentation.

15. The method as set forth in claim 9 wherein said particular type of displayed image comprises a display of a menu function indicium.

16. The method as set forth in claim 9 wherein said particular type of displayed image comprises a display of a graphics image.

17. The method as set forth in claim 16 wherein said graphics image represents an executable function.

18. The method as set forth in claim 9 and further including a plurality of types of displayed images.

19. The method as set forth in claim 18 and further including enabling said user to select a particular sound to be associated with each selected particular type of displayed image.

20. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective for presenting audio effects in association with e an image which may be displayed on a display screen of said computer system, said program signals being selectively operable to accomplish the steps of:

presenting a plurality of user selections on said display screen, said user selections being related to said image;

effecting a selection made by said user to associate a selected sound with a corresponding selected image;

determining an indicator location of a screen position indicator on said display screen;

detecting a presence of a displayed image at said indicator location; and projecting a sound from said computer system, said sound being related to said displayed image, said sound being projected to a point away from said computer system such that said sound is perceivable as emanating from an emanation point displaced in space from said computer system.

21. A computer system comprising:

a system bus;

a sound producing subsystem, said sound producing subsystem being coupled to said system bus;

a processor device connected to said system bus;

a memory connected to said system bus; and a display device including a display screen, said display device being coupled to said system bus, said processor device being responsive to program signals received from said memory for causing said sound producing subsystem to present audio effects in association with a an image which may be displayed on said display screen of said computer system, said program signals being selectively operable to accomplish the steps of:

- presenting a plurality of user selections on said display screen, said user selections being related to said image;
- effecting a selection made by said user to associate a selected sound with a corresponding selected image;
- determining an indicator location of a screen position indicator on said display screen;
- detecting a presence of a displayed image at said indicator location; and
- projecting a sound from said computer system, said sound being related to said displayed image, said sound being projected to a point away from said computer system such that said sound is perceivable as emanating from an emanation point displaced in space from said computer system.

22. A method for presenting audio effects in association with a display screen of a computer system, said method comprising:

enabling a user to make selections from a displayed listing of sound types and image types, said selections being effective to associate selected sound types with corresponding selected image types;

determining a display screen location and image type for a displayed image; and projecting a sound from said computer system, said sound corresponding to said displayed image type, said sound being projected such that said sound is perceivable as emanating from an emanation point displaced in space from said computer system.

\* \* \* \* \*